(12) United States Patent
Ogane

(10) Patent No.: US 9,715,043 B2
(45) Date of Patent: Jul. 25, 2017

(54) OPTICAL MEMBER AND METHOD OF PRODUCING THE SAME

(75) Inventor: Masanobu Ogane, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/233,723

(22) PCT Filed: Jul. 11, 2012

(86) PCT No.: PCT/JP2012/004475
§ 371 (c)(1),
(2), (4) Date: Jan. 17, 2014

(87) PCT Pub. No.: WO2013/011664
PCT Pub. Date: Jan. 24, 2013

(65) Prior Publication Data
US 2014/0153099 A1 Jun. 5, 2014

(30) Foreign Application Priority Data
Jul. 21, 2011 (JP) .................................. 2011-160078

(51) Int. Cl.
| | |
|---|---|
| *G02B 1/11* | (2015.01) |
| *B05D 1/00* | (2006.01) |
| *B05D 3/02* | (2006.01) |
| *G02B 5/02* | (2006.01) |
| *B82Y 20/00* | (2011.01) |

(52) U.S. Cl.
CPC .............. *G02B 1/11* (2013.01); *B05D 1/005* (2013.01); *B05D 3/0254* (2013.01); *G02B 5/0247* (2013.01); *G02B 5/0278* (2013.01); *B82Y 20/00* (2013.01); *Y10S 977/834* (2013.01)

(58) Field of Classification Search
CPC .. G02B 5/0221; G02B 5/0226; G02B 5/0247; G02B 5/0278; G02B 1/11; B05D 1/00; B05D 1/005; Y10S 977/834; B82Y 20/00
See application file for complete search history.

(56) References Cited

U.S. PATENT DOCUMENTS

| | | | |
|---|---|---|---|
| 6,383,559 B1 | 5/2002 | Nakamura | |
| 2004/0209056 A1* | 10/2004 | Oguri | ........................... 428/212 |
| 2011/0195239 A1 | 8/2011 | Takane | |

FOREIGN PATENT DOCUMENTS

| | | |
|---|---|---|
| CN | 101685168 A | 3/2010 |
| EP | 0778476 A2 | 6/1997 |
| JP | 05-027102 A | 2/1993 |
| JP | H05-027102 A | 2/1993 |

(Continued)

OTHER PUBLICATIONS

Otani et al., WO 2011/027827, English Language Machine Translation, Accessed Jun. 15, 2015.*

*Primary Examiner* — Stephone B Allen
*Assistant Examiner* — Adam W Booher
(74) *Attorney, Agent, or Firm* — Canon U.S.A., Inc., IP Division (57) ABSTRACT

Provided are an optical member having abrasion resistance and transparency and a method of producing the optical member. The method of producing the optical member includes coating a coating material containing hollow particles and a solvent on a substrate and further coating a coating material containing a binder and a solvent to form a film in which the binder lies between the hollow particles; and then drying the film.

7 Claims, 2 Drawing Sheets (56) References Cited

FOREIGN PATENT DOCUMENTS

| | | | |
|---|---|---|---|
| JP | 09-288201 | A | 11/1997 |
| JP | H11-153703 | A | 6/1999 |
| JP | 2001-233611 | A | 8/2001 |
| JP | 2003-054996 | A | 2/2003 |
| JP | 2006-151800 | A | 6/2006 |
| JP | 2007-090865 | A | 4/2007 |
| JP | 2008-139581 | A | 6/2008 |
| JP | 2009-73170 | A | 4/2009 |
| JP | 2010-186160 | A | 8/2010 |
| TW | 574110 | B | 2/2004 |
| WO | 02/18982 | A1 | 3/2002 |
| WO | 2010/044402 | A1 | 4/2010 |
| WO | 2010/140713 | A1 | 12/2010 |
| WO | 2011/027827 | A1 | 3/2011 |

* cited by examiner

OPTICAL MEMBER AND METHOD OF PRODUCING THE SAME

TECHNICAL FIELD

The present invention relates to an optical member having abrasion resistance and transparency and relates to a method of producing the optical member.

BACKGROUND ART

In order to prevent reflection at the light incident/emitting surface of an optical member, it has been known to form an antireflection film of a monolayer or multilayer of optical films having different refractive indices laminated in a thickness of several tens to several hundreds nanometers. Such an antireflection film is formed by a vacuum deposition process such as vapor deposition or sputtering or a wet film-formation process such as dip-coating or spin-coating.

As the material for the outermost layer of the antireflection film, transparent materials having low refractive indices, for example, inorganic materials such as silica, magnesium fluoride, and calcium fluoride and organic materials such as silicone polymers and amorphous fluorine polymers are known.

In order to further reduce reflectivity, it is recently known to use a low-refractive-index film, which utilizes the fact that air has a refractive index of 1.0, in the antireflection film. Refractive index can be reduced by forming voids in a layer of silica or magnesium fluoride. For example, the refractive index of a magnesium fluoride thin film can be reduced from 1.38 to 1.27 by providing 30 vol % of voids in the film.

An antireflection film having a low refractive index can be prepared by forming voids between fine particles of silica or magnesium fluoride through film formation using the fine particles together with a binder (PTL 1 and PTL 2).

In another method of forming voids, the voids are formed using hollow silica particles. In this method, an antireflection film is formed using these hollow particles (PTL 3).

It is known, however, that the use of hollow silica particles in optical members such as the antireflection film causes problems in transparency and appearance. This is due to that the hollow silica particles have low affinity to the organic solvent or the organic polymer that is mixed with the hollow silica particles and aggregate during preparing a coating material to cause scattering. In order to solve this problem, a film is formed by a coating material not containing an organic polymer to prevent aggregation, and an antireflection film is formed using this low-refractive-index film not causing scattering (PTL 4).

In order to prevent scattering, the antireflection film described in PTL 4 does not contain a binder represented by organic polymers. A film not containing a binder has a problem of insufficient abrasion resistance, since the outermost layer of an antireflection film is required to have abrasion resistance as well as a low refractive index and transparency.

In the case of using voids between particles and also forming voids inside a binder in order to further reduce the refractive index, voids become ununiform by, for example, aggregation of particles and void sizes locally increase to cause a problem of insufficient transparency.

CITATION LIST

Patent Literature

PTL 1: Japanese Patent Laid-Open No. 2006-151800
PTL 2: International Patent No. WO02/018982
PTL 3: Japanese Patent Laid-Open No. 2001-233611
PTL 4: Japanese Patent Laid-Open No. 2009-73170
PTL 5: Japanese Patent Laid-Open No. 2008-139581

SUMMARY OF INVENTION

The present invention has been accomplished under such circumstances and provides a method of producing an optical member having abrasion resistance and also transparency and provides an optical element.

The method of producing an optical member of the present invention includes a process of forming an antireflection film on a substrate. The process of forming the antireflection film includes a step of forming a layer in which spaces between particles are filled with a binder by coating a liquid having the particles dispersed in a dispersion medium and then coating a solution containing a component necessary for forming the binder and a step of drying the layer.

In the optical member for solving the problems described above, an antireflection film is formed on a substrate. The antireflection film has a layer formed of multi-stacked particles aligned in the direction parallel to the substrate surface, and spaces between the particles in the layer are filled with a binder.

The present invention provides a method of producing an optical member having abrasion resistance and also transparency and provides the optical member.

Further features of the present invention will become apparent from the following description of exemplary embodiments with reference to the attached drawings.

DESCRIPTION OF EMBODIMENT

A preferred embodiment of the present invention will now be described in detail with reference to the drawings.

Figure 1:
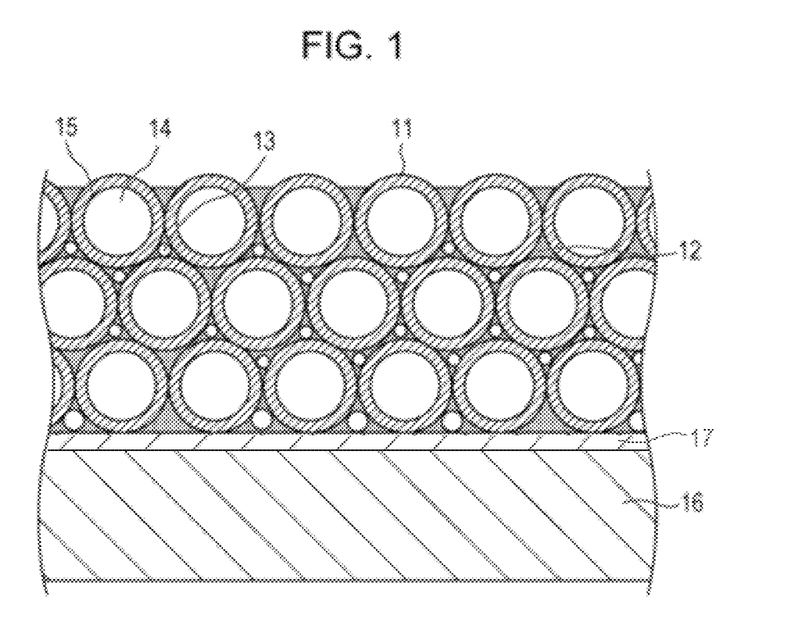
FIG. 1 is a schematic view illustrating an embodiment of an optical member of the present invention.

FIG. 1 is a schematic view illustrating an embodiment of an optical member of the present invention. In the optical member of the present invention in this drawing, an antireflection film is formed on a substrate. The antireflection film has a layer formed of multi-stacked particles aligned in the direction parallel to the substrate surface, and spaces between particles 11 in the layer filled with a binder 12. The particles 11 are bonded to one another with the binder 12, and binder 12 is provided with a plurality of voids 13. Reference sign 16 stands for the substrate.

The layer is formed of multi-stacked particles aligned in the direction parallel to the substrate surface. Throughout the specification, the state of being aligned in the direction parallel to the substrate surface means a state that the deviation in height of each particle aligned in each tier is within the radius of the particle from the plane parallel to the substrate surface and that the distance between the particles adjacent to each other aligned in the direction parallel to the substrate surface is smaller than the radius of the particle in most of the particles excluding in the local void portion. Whether the particles are aligned in the direction parallel to the substrate surface is determined by observing a cross section of the antireflection film in the direction parallel to the normal of the substrate surface. For example, a cross section of a layer in the direction parallel to the normal of the substrate surface observed by a reflection electron microscope is subjected to image processing for observation. The image processing can be performed using commercially available image processing means, Image-Pro Plus (manufactured by Media Cybernetics, Inc.). If particles are aligned in the direction parallel to the substrate surface in each tier, the heights of the particles from a plane parallel to the substrate surface are constant in each tier. Accordingly, spherical particles can be confirmed through observation of the film surface by a reflection electronic image taken from the direction of the normal of the substrate. In the state where particles aligned in the direction parallel to the substrate surface are multi-stacked, gaps between the particles are uniformly distributed, and thereby the voids are small and uniform. In particular, in the case of hollow particles, scattering is prevented, and thereby a considerable effect is expressed.

The two-dimensional density of the particles aligned in the antireflection film of the optical member of the present invention is 0.8 or more and 0.88 or less. Throughout the specification, the term "two-dimensional density" refers to the area ratio of the particles to the whole plane. This area ratio can be measured by image processing of a cross section of a film observed by a reflection electron microscope in the direction parallel to the normal of the substrate surface. The image processing can be performed using commercially available image processing means, Image-Pro Plus (manufactured by Media Cybernetics, Inc.). The area ratio can be determined by measuring the area of particles in a predetermined image region through particle measurement, with optionally adjusting the contrast to an appropriate level, and calculating the ratio of the area of particles to the area of the predetermined image region. This two-dimensional density defines the alignment state of the particles. A higher density means a state that the particles are aligned with smaller gaps between particles. The two-dimensional density when the particles are true spheres and are aligned at the highest density is hexagonally packed arrangement having a two-dimensional density of about 0.90.

The density, i.e., the alignment, varies mainly depending on the dispersion state of the particles. When the particles are uniformly dispersed in a dispersion medium, the particles easily align. Even in a dispersed state, if the particles are slightly aggregated by influence of the dispersion medium, the alignment is deteriorated. Deterioration in alignment enlarges the gaps between the particles to enlarge the voids in the direction of the substrate surface. That is, in a two-dimensional density of less than 0.8, voids large in the plane direction occur to increase scattering of visible light. Accordingly, the two-dimensional density is controlled to be 0.8 or more. Though a better alignment of particles is preferred, it is substantially difficult to produce a film having a two-dimensional density of 0.88 or more.

The particle 11 has a hole 14 therein and a shell 15 surrounding the hole 14. The air (refractive index: 1.0) contained in the hole 14 can reduce the refractive index of the antireflection film. The hole may be monoporous or multiporous, and they can be appropriately selected. The material constituting the hollow particles can have a low refractive index, and examples thereof include $SiO_2$, $MgF_2$, fluorine, and organic polymers such as silicone. $SiO_2$ can easily form hollow particles by, for example, the method described in PTL 3 or PTL 5. The use of hollow particles can reduce the refractive index of the layer formed of multi-stacked particles aligned in the direction parallel to the substrate surface. When the particles are hollow particles, the effects of the present invention can be further expressed. The particles may be solid particles of a metal oxide or an organic polymer such as $SiO_2$, $MgF_2$, fluorine, or silicone.

The average particle diameter of the hollow particles can be 15 nm or more and 100 nm or less, preferably 15 nm or more and 60 nm or less. If the average particle diameter of the hollow particles is less than 15 nm, it is difficult to stably form particles serving as cores. In contrast, an average particle diameter of higher than 100 nm increases the sizes of the voids between the particles to easily cause large voids and causes scattering due to the increase in size of the particles.

Throughout the specification, the term "average particle diameter of hollow particles" refers to an average Feret's diameter. The average Feret's diameter can be measured by image processing of an image observed by a transmission electron microscope. The image processing can be performed using commercially available image processing means, Image-Pro Plus (manufactured by Media Cybernetics, Inc.). The average particle diameter can be determined by measuring the average Feret's diameter of each particle in a predetermined image region through particle measurement, with optionally adjusting the contrast to an appropriate level, and calculating the average of the average Feret's diameters.

The thickness of the shell 15 of the hollow particle can be 10% or more and 50% or less, preferably 20% or more and 35% or less, of the average particle diameter. If the thickness of the shell is less than 10% of the average particle diameter, the strength of the particle is insufficient. If the thickness is higher than 50% of the average particle diameter, the effect of emptiness is not significantly expressed in the refractive index.

The content of the hollow particles contained in the layer formed of multi-stacked particles aligned in the direction parallel to the substrate surface of the present invention can be 50 wt % or more and 85 wt % or less, preferably 75 wt % or more and 85 wt % or less, based on the whole layer formed of multi-stacked particles aligned in the direction parallel to the substrate surface.

The binder in the present invention can be appropriately selected depending on the abrasion resistance, adhesion, and environmental reliability of the film. For example, an alkoxysilane hydrolysis-condensation product can be used. The alkoxysilane hydrolysis-condensation product can have a weight-average molecular weight of 1000 or more and 3000 or less in terms of polystyrene. If the weight-average molecular weight is less than 1000, cracking tends to occur after hardening of the binder, and stability as a coating material decreases. A weight-average molecular weight of higher than 3000 increases the viscosity, which tends to make the voids inside the binder ununiform and thereby causes large voids.

The content of the binder contained in the layer formed of multi-stacked particles aligned in the direction parallel to the substrate surface of the present invention can be 15 wt % or more and 50 wt % or less, preferably 15 wt % or more and 25 wt % or less, based on the whole layer formed of multi-stacked particles aligned in the direction parallel to the substrate surface.

The binder in the layer formed of multi-stacked particles aligned in the direction parallel to the substrate surface of the present invention contains a plurality of voids therein. The state that the binder contains voids therein means that the binder itself has voids, i.e., the binder has voids, voids 13, separately from the hole 14 of the hollow particle 11. The refractive index of the antireflection film can be further reduced by the voids possessed by the binder separately from the holes of the hollow particles.

In the present invention, the binder contains voids having a cross-sectional area of less than 1000 nm$^2$ and voids having a cross-section area of 1000 nm$^2$ or more. The number of the voids having a cross-sectional area of 1000 nm$^2$ or more contained in the binder is zero to ten per square micrometers of the cross-sectional area of the binder. That is, many of the voids contained in the binder have a cross-sectional area of less than 1000 nm$^2$.

The voids in the binder occur when the volume of the binder is smaller than the volume of gaps between the hollow particles constituting the layer having a low refractive index. Occurrence of such voids can be controlled by adjusting the ratio of the hollow particles contained in the film-forming coating material to the solution containing a component necessary for forming a binder. However, a decrease in amount of the solution containing a component necessary for forming a binder contained in the coating material and thereby an increase in volume of gaps between hollow particles tend to cause uneven distribution of the binder, resulting in unevenness in size of the voids. Though such a ununiform state is not a problem in common particles, in hollow particles having thin walls due to the holes, the voids and the holes of the hollow particles become to be detected by light as large voids due to the effective medium approximation of refractive indices. Consequently, the void sizes become uneven, and voids having cross-sectional area of 1000 nm$^2$ or more occur. An increase in the number of such voids increases scattering in visible light. Accordingly, the number of voids having a cross-sectional area of 1000 nm$^2$ or more is controlled to be ten or less per square micrometers and further to be zero.

The total content of the voids contained in the layer formed of multi-stacked particles aligned in the direction parallel to the substrate surface of the present invention can be 5 vol % or more and 25 vol % or less, preferably 10 vol % or more and 20 vol % or less, based on the volume of the antireflection film.

The thickness d of the layer formed of multi-stacked particles aligned in the direction parallel to the substrate surface of the present invention can be in the following range:

[Math. 1]

$$\frac{2}{5} \cdot 2a + a \cdot n \cdot \sqrt{\frac{8}{3}} \leq d \leq \frac{4}{5} \cdot 2a + \alpha \cdot n \cdot \sqrt{\frac{8}{3}} \qquad \text{(Expression 1)}$$

(wherein, a represents average particle radius of the hollow particles; and n represents a positive integer).

The antireflection film of the present invention is formed by hollow particles and a binder separately. The number of voids having a cross-sectional area of 1000 nm$^2$ or more is small after film formation of the coating material containing the hollow particles and a solvent. However, voids of 1000 nm$^2$ or more occur by migration of the hollow particles in the form of a film into a solution containing a component necessary for forming a binder applied to the substrate provided with the film of the hollow particles or aggregation of the particles associated with drying shrinkage of the solution containing a component necessary for forming a binder, and these voids cause scattering. The present inventors have diligently studied and, as a result, have found that this occurrence of voids can be reduced by increasing the density of the particles to prevent the particles from moving. In the antireflection film of the present invention, the particles are aligned in a hexagonal close-packed state, and the film thickness is controlled by the density of the particles and the number of tiers of the particles. Accordingly, the particles are densely packed at a film thickness period of the thickness of one tier:

[Math. 2]

$$a \cdot \sqrt{\frac{8}{3}} \qquad \text{(Expression 2)}$$

when the particles are aligned in a hexagonal closed-packed state. Since the particles in the first tier are spherical, the optically effective film thickness is experimentally about ⅗a. Consequently, the thickness of the second and subsequent particles most densely packed is

[Math. 3]

$$\frac{3}{5} \cdot 2a + a \cdot n \cdot \sqrt{\frac{8}{3}} \qquad \text{(Expression 3)}$$

(wherein, n represents a positive integer). Thus, occurrence of voids of 1000 nm$^2$ or more is reduced as low as possible to decrease scattering. Accordingly, scattering can be reduced by controlling the thickness within the range shown by Expression 1.

The thickness of the layer formed of multi-stacked particles aligned in the direction parallel to the substrate surface of the present invention can be 80 nm or more and 200 nm or less. By designing the thickness of the layer in this range, the reflectivity in the visible region can be reduced in both films having a monolayer or a multilayer.

An example of the method of producing the optical member according to the present invention will now be described.

In this embodiment, a liquid having particles dispersed in a dispersion medium is coated on a substrate, and a solution containing a component necessary for forming a binder is further coated thereon to form a layer in which spaces between the particles are filled with the binder, and the layer is dried.

The alignment of particles can be improved without inhibition by a binder by first forming a film only with the particles. In addition, even if a film is subsequently formed by the solution containing a component necessary for forming a binder, the spaces between the particles can be filled with the binder while the alignment of the particles are maintained. The film thus formed by allowing the binder to lie between the particles has abrasion resistance and can prevent scattering.

The particles used in the dispersion liquid can have surfaces modified with, for example, methyl groups. Such particles can reduce the viscosity in the form of slurry. Accordingly, in the case of hollow silica particles, as a precursor for forming walls of hollow particles, trifunctional silane modified with a methyl group, such as methyl triethoxy silane or methyl trimethoxy silane, can be used. The material used as the precursor may be a mixture of trifunctional silane mentioned above and tetrafunctional silane such as tetraethoxy silane. A composition that allows stable production of particles can be selected.

The concentration of the particles contained in the liquid having the particles dispersed in a dispersion medium can be low in the range that allows formation of a film with a desired thickness. An increase in solid concentration increases the viscosity to reduce the alignment of the particles and also deteriorates the dispersion state to make formation of uniform voids inside the film difficult. Accordingly, the film is formed under conditions that allow formation of the film at a lower solid concentration.

The concentration of the component necessary for forming a binder in the solution containing the component can be appropriately selected depending on the solvent and the conditions for forming a film in the range that allows the resulting film of particles to contain the binder in a desired content.

As the dispersion medium used in the dispersion liquid, a medium having satisfactory affinity to the particles can be appropriately selected. A dispersion medium having low affinity causes aggregation. If the affinity between the solvent contained in the solution containing a component necessary for forming a binder and the component necessary for forming a binder is low, the component necessary for forming a binder is not compatible with the solvent. Even if the component is dispersed in or compatible with the solvent as a coating material, aggregation or separation occurs during formation of the film to cause whitening. A dispersion medium or a solvent having a boiling point of 100 degrees Celsius or more and 200 degrees Celsius can be used. Examples of such a dispersion medium or solvent include 1-methoxy-2-propanol, 2-ethyl-1-butanol, methyl cellosolve, ethyl cellosolve, and butyl cellosolve, and mixtures thereof.

The dispersion medium used in the present embodiment can contain hollow particles. Instead of the hollow particles, solid metal oxide particles or a mixture of hollow particles and solid particles may be used. The abrasion resistance of a film can be increased by using solid metal oxide particles. Any particles can be used without specific limitation, but particles having a low refractive index, such as particles of $SiO_2$ or $MgF_2$, can be used from the viewpoint of refractive index. The metal oxide particles having an average particle diameter of 10 nm or less can be used.

The substrate used for coating can be a glass or polymer substrate. The substrate may have any shape such as a plane, curve, concave, convex, or film.

Coating of a coating material containing hollow particles and a solvent may be performed by any method without particular limitation. The subsequent formation of a film by the solution containing a component necessary for forming a binder is performed after formation of the film of the particles. Therefore, immersion such as dip coating causes detachment of the particles adhering to the substrate. Accordingly, the formation of the film with the solution containing a component necessary for forming a binder is performed by any common method for liquid-coating other than immersion, such as spin coating or spray coating. From the viewpoint of detachment of particles mentioned above or in the light of forming a film having a uniform thickness on a substrate having a curve, such as a lens, a film of the coating material can be formed by spin coating.

After the coating, drying is performed. The drying can be performed using, for example, a hot plate or an electric furnace. The temperature and time as drying conditions are set not to affect the substrate and to be capable of evaporating the organic solvent inside hollow particles. In general, the temperature is 300 degrees Celsius or less.

In addition, the antireflection film may have a monolayer or a multilayer of, for example, a high-refractive-index layer or a medium-refractive-index layer 17 between the layer formed of multi-stacked particles 11 aligned in the direction parallel to the substrate surface and the substrate. Examples of the material of the high-refractive-index layer and the medium-refractive-index layer include zirconium oxide, titanium oxide, tantalum oxide, niobium oxide, hafnium oxide, alumina, silica, and magnesium fluoride. These layers can be formed by, for example, vapor deposition or sputtering.

The antireflection film may have a monolayer or a multilayer having a function such as water repellency or oil repellency on the layer formed of multi-stacked particles 11 aligned in the direction parallel to the substrate surface. Examples of the material of the functional layer include fluorine-containing coating materials and silicone-containing coating materials.

These refractive layer and functional layer can be formed by vacuum vapor deposition, sputtering, CVD, dip coating, spin coating, or spray coating.

The present invention will now be more specifically described by examples, but is not limited the following examples within the scope of the present invention.

EXAMPLES

Examples 1 to 3

An optical member was produced by coating a liquid having particles dispersed in a dispersion medium on a substrate and then a solution containing a component necessary for forming a binder and performing drying. In the Examples, the concentration of the solid in the solution containing a component necessary for forming a binder was varied for evaluation.

The samples of Examples 1 to 3 were prepared as follows.

(Liquid having Particles Dispersed in a Dispersion Medium)

A dispersion liquid (solid concentration: 3.6 wt %) was prepared by diluting 6.0 g of a hollow silica slurry IPA dispersion liquid (Sluria 1110, manufactured by JGC C&C, average Feret's diameter: 55 nm, solid concentration: 20.5 wt %) with 28.1 g of 1-methoxy-2-propanol (Cica special grade, manufactured by Kanto Chemical Co., Inc.).

(Solution Containing a Component Necessary for Forming a Binder)

Solutions containing a component necessary for forming a binder were prepared by respectively diluting 6.0 g of an alkoxysilane hydrolysis-condensation product (Accuglass T-11 (111), manufactured by Haneywell, solid concentration: 4.5 wt %) with 29.5 g (solid concentration: 0.76 wt %, Example 1), 48.0 g (solid concentration: 0.5 wt %, Example 2), or 21.0 g (solid concentration: 1.0 wt %, Example 3) of 1-methoxy-2-propanol (Cica special grade, manufactured by Kanto Chemical Co., Inc.). Each solid concentration shown in the parentheses denotes the concentration in the prepared solutions.

(Film Formation)

On each glass substrate BK7 having a diameter of 39 mm and a thickness of 2 mm, 0.2 mL of the liquid having particles dispersed in a dispersion medium was dropped, and a film was formed using a spin coater at 3000 rpm for 30 sec. Subsequently, 0.2 mL of the solution containing a component necessary for forming a binder of Example 1, 2, or 3 was dropped on the substrate provided with the film of the liquid having particles dispersed in a dispersion medium, and a film was formed using a spin coater at 3000 rpm for 30 sec. Subsequently, the substrates after film formation were each fired at 200 degrees Celsius for 1 hour to form a film to prepare an optical member of Example 1, 2, or 3.

(Evaluation)

The reflectivity of the optical member prepared in each Example was measured with lens spectral reflectivity measurement instrument (USPM-RU, manufactured by Olympus Corp.) over the wavelength of 400 to 700 nm. The refractive index of the optical member was determined from the refractive index of the substrate and the wavelength showing the minimum reflectivity. The initial refractive indices of the optical members in Examples 1 to 3 were 1.25, 1.23, and 1.27, respectively.

Each optical member was rubbed with cotton cloth (Clint, manufactured by Asahi Kasei Chemicals Corp.) at a load of 300 g/cm$^2$ for 20 times reciprocation, and, then, the refractive index of the optical member was measured as in above. As a result, no variation in refractive index was confirmed, and no scratch was observed.

Scattering was evaluated as follows. A substrate holder was set so that the optical member is constantly placed at the same position. An illuminometer (T-10M, manufactured by Konica Minolta Sensing, Inc.) was set to the substrate holder. The substrate surface side was irradiated with white light at an illumination intensity, from the perpendicular direction to the surface, of 4000 lux while measuring the illumination intensity. Separately, a substrate equipped with an antireflection film of Comparative Example 1 described below was set so that the film-provided face of the substrate was the white light irradiation side. Each substrate was tilted by 45 degrees, and a photograph was taken from the normal direction of the opposite face of the irradiation face by a camera (lens: EF 50 mm F2.5 compact macro manufactured by CANON KABUSHIKI KAISHA, camera: EOS-7D, manufactured by CANON KABUSHIKI KAISHA). The photographing conditions with the camera were ISO 400, white balance: fine weather, aperture: 20, and shutter speed: 10 sec. The average of luminances at any four positions in 700 pix by 700 pix on the substrate surface in the photographed image was calculated as the scattering value for evaluating scattering. The substrate was tilted by 45 degrees and was irradiated with white light from the rear face of the film-provided face by a projector to confirm the scattering state. The scattering values of the optical members of Examples 1 to 3 were 17, 15, and 19, respectively. In every Example, the scattering values were small, and the resulting optical members were transparent.

In order to confirm the void state of a substrate, the substrate was cut out with a thickness of 100 nm in the cross-sectional direction of the substrate by a focused ion beam apparatus (SMI3200F, manufactured by SII Nano-Technology Inc.), and the cross-sectional condition was subjected to bright-field transmission observation by a scanning transmission electron microscope (S-5500, manufactured by Hitachi High-Technology Corp.) with a magnification of 25000 times. The void portion was observed by being emphasized in white. The white portions, i.e., the voids, of the photographed transmission image were measured with Image-Pro Plus (manufactured by Media Cybernetics, Inc.) to count the number of voids having a cross-sectional area of 1000 nm$^2$ or more. As a result, the number of such voids was zero per square micrometers in every example.

Figure 2:
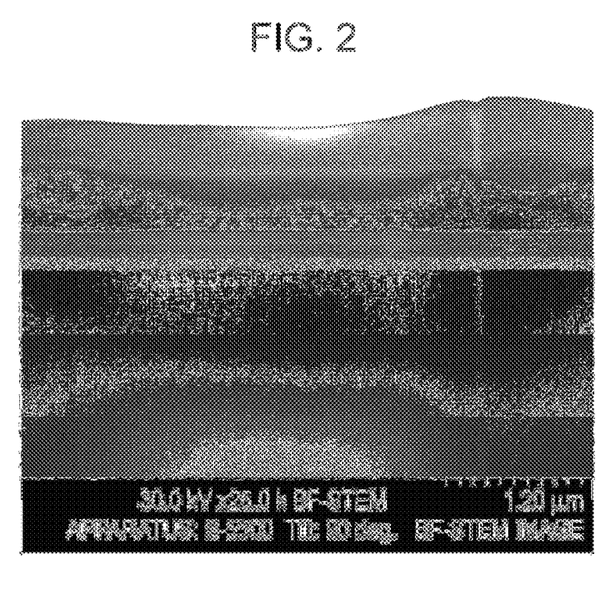
FIG. 2 is a scanning transmission electron microscope photograph of the antireflection film of Example 1.

FIG. 2 is a scanning transmission electron microscope photograph of a cross section of the film in Example 1. It was confirmed by FIG. 2 that the deviation in height of each particle was within the radius of the particle and that the particles aligned in the direction parallel to the substrate surface were stacked in three tiers. No large void having a cross-sectional area of 1000 nm$^2$ or more was present. No ununiform distribution of the particles was observed, and the gaps between the particles were uniformly distributed. The alignment states in Examples 2 and 3 were similarly observed to confirm that the particles aligned in the direction parallel to the substrate surface were stacked in three tiers.

The optical members of Examples 1 to 3 were evaluated for two-dimensional density. In order to confirm the surface states of these optical members, the surfaces were observed by a scanning reflection electron microscope at a magnification of 100000 times. In every optical member, the state that particles aligned in the direction parallel to the substrate surface were stacked in three tiers was confirmed. The area of a surface particle portion in any 500 nm by 500 nm region of the photographed image was determined using Image-Pro Plus (manufactured by Media Cybernetics, Inc.), and the area ratio of the particle portion to the area for evaluation was determined as the two-dimensional density. The two-dimensional densities of the optical members of Examples 1 to 3 were 0.86, 0.88, and 0.85, respectively.

Comparative Example 1

In this Comparative Example, antireflection films having different two-dimensional densities produced using a coating material having different dispersion states due to changes of the coating material with time were evaluated.

(Preparation of Coating Material)

Coating material stock solution B was prepared by mixing 18.0 g of a hollow silica slurry IPA dispersion liquid (Sluria 1110, manufactured by JGC C&C, average Feret's diameter: 50 nm, solid concentration: 20.5 wt %) and 13.7 g of an alkoxysilane hydrolysis-condensation product A (Accuglass T-11 (111), manufactured by Haneywell, solid concentration: 4.5 wt %).

A coating material was prepared by diluting 10 g of coating material stock solution B with 20.9 g of 2-n-butoxyethanol (special grade, manufactured by Kishida Chemical Co., Ltd.).

(Film Formation)

On a glass substrate BK7 having a diameter of 39 mm and a thickness of 2 mm, 0.2 mL of the coating material was dropped, and a film was formed using a spin coater at 3000 rpm for 30 sec. Subsequently, the substrate after film formation was fired at 200 degrees Celsius for 1 hour to form a film to prepare an optical member of Comparative Example 1.

(Evaluation)

The optical member produced in Comparative Example 1 was evaluated for refractive index and abrasion resistance as in Example 1. As a result, the initial refractive index was 1.23, and after the abrasion resistance test, no variation in refractive index was confirmed, and no scratch was observed.

Scattering was also evaluated as in Example 1, and the scattering value was 32.

In order to confirm the void state of this optical member, the number of the voids having a cross-sectional area of 1000 nm$^2$ or more was counted by the same method as in Example 1. As a result, the number of such voids was twelve per square micrometers.

The alignment state of the particles was confirmed as in Example 1. The results confirmed that deviation in height of the particles was larger than the radii of the particles and that the particles were not aligned in the direction parallel to the substrate surface.

The two-dimensional density was evaluated by the same method as in Example 1, but the particles were not aligned in the direction parallel to the substrate surface, and therefore the two-dimensional density could not be determined.

Examples 4 to 6 and Comparative Example 2

A liquid having particles dispersed in a dispersion medium and a solution containing a component necessary for forming a binder were prepared as follows.

(Liquid having Particles Dispersed in a Dispersion Medium)

A dispersion liquid (solid concentration: 4.4 wt %) was prepared by diluting 6.0 g of a hollow silica slurry IPA dispersion liquid (Sluria 1110, manufactured by JGC C&C, average Feret's diameter: 50 nm, solid concentration: 20.5 wt %) with 22 g of 2-n-butoxyethanol (special grade, manufactured by Kishida Chemical Co., Ltd.).

(Solution Containing a Component Necessary for Forming a Binder)

A solution (solid concentration: 0.76 wt %) was prepared by diluting 6 g of an alkoxysilane hydrolysis-condensation product (Accuglass T-11 (111), manufactured by Haneywell, solid concentration: 4.5 wt %) with 29.5 g of 2-n-butoxyethanol (special grade, manufactured by Kishida Chemical Co., Ltd.).

(Film Formation)

On a glass substrate BK7 having a diameter of 39 mm and a thickness of 2 mm, 0.2 mL of the liquid having particles dispersed in a dispersion medium was dropped 10 min after the preparation (Example 4), 3 hours after the preparation (Example 5), or left to stand for 1 week at 4 degrees Celsius after the preparation (Example 6) at a solution temperature of 23 degrees Celsius at a room temperature of 23 degrees Celsius, and a film was formed using a spin coater at 2000 rpm for 90 sec. On each substrate provided with the film of the liquid having the particles dispersed a dispersion medium, 0.2 mL of the solution containing a component necessary for forming a binder left to stand for 3 hours after the preparation was dropped, and a film was formed using a spin coater at 2000 rpm for 90 sec. Subsequently, the substrates provided with the films were each fired at 200 degrees Celsius for 1 hour to form a film to prepare an optical member of Example 4, 5, or 6. Separately, the dispersion liquid was stored at 4 degrees Celsius for 1 month after the preparation (Comparative Example 2). An optical member was produced using this liquid. That is, on a glass substrate, 0.2 mL of the liquid was dropped at a solution temperature of 23 degrees Celsius at a room temperature of 23 degrees Celsius, and a film was formed using a spin coater at 2000 rpm for 90 sec. On this substrate provided with the film of the liquid, 0.2 mL of a solution containing a component necessary for forming a binder left to stand for 3 hours after the preparation was dropped, and a film was formed using a spin coater at 2000 rpm for 90 sec. Subsequently, the substrate provided with the films was fired at 200 degrees Celsius for 1 hour to form a film to prepare an optical member of Comparative Example 2.

(Evaluation)

The optical members produced above were evaluated for refractive index and abrasion resistance as in Example 1. As a result, the initial refractive index of each optical member was 1.23, and after the abrasion resistance test, no variation in refractive index was confirmed, and no scratch was observed.

Scattering was also evaluated as in Example 1. The scattering values of the antireflection films formed on the substrates in Examples 4 to 6 and Comparative Example 2 were 22, 25, 30, and 32, respectively. The scattering values in Examples 4 to 6 were lower than that in Comparative Example 1, but the scattering value of Comparative Example 2 was equal to that in Comparative Example 1.

The two-dimensional densities of the optical members of Examples 4 to 6 and Comparative Example 2 were evaluated by the method as in Example 1. The two-dimensional densities in Examples 4 to 6 and Comparative Example 2 were 0.88, 0.83, 0.80, and 0.78, respectively. In a film having a two-dimensional density of 0.8 or more, a decrease in the scattering value compared to Comparative Example 1 was confirmed. However, the scattering value in Comparative Example 2 in which the two-secondary density was 0.78 was equal to that in Comparative Example 1.

In order to confirm the void states of the substrates in Examples 4 to 6, the number of voids having a cross-sectional area of 1000 $nm^2$ or more was counted by the same method as in Comparative Example 1. As a result, the number of such voids was zero per square micrometers in every example. The alignment states of the particles were confirmed as in Example 1. As a result, the deviation in height of each particle was confirmed to be within the radius of the particle. In contrast, in Comparative Example 2, the particles aggregated to disorder the alignment of the particles. As a result, the deviation in height of the particles was larger than the radii of the particles, and the particles aligned in the direction parallel to the substrate surface were not stacked.

Examples 7 to 25

In these examples, the solid concentration of the liquid having particles dispersed in a dispersion medium and the spin coating conditions were changed, and antireflection films having different thicknesses were evaluated.

Liquids having particles dispersed in a dispersion medium and a solution containing a component necessary for forming a binder were prepared.

(Liquid having Particles Dispersed in a Dispersion Medium)

Liquids having particles dispersed in a dispersion medium having a solid concentration of 3.6 wt %, 3.8 wt %, 4.0 wt %, 4.2 wt %, or 4.4 wt % were prepared by diluting 6.0 g of a hollow silica slurry IPA dispersion liquid (Sluria 1110, manufactured by JGC C&C, average Feret's diameter: 50 nm, solid concentration: 20.5 wt %) with 2-n-butoxyethanol (special grade, manufactured by Kishida Chemical Co., Ltd.).

(Solution Containing a Component Necessary for Forming a Binder)

A solution having a solid concentration of 0.8 wt % was prepared by diluting 6 g of an alkoxysilane hydrolysis-condensation product (Accuglass T-11 (111), manufactured by Haneywell, solid concentration: 4.5 wt %) with 27.8 g of 2-ethyl-1-butanol (EP, manufactured by Tokyo Chemical Industry Co., Ltd.).

(Film Formation)

In order to prepare antireflection films having different thicknesses, in Examples 7 to 25, the concentration of the dispersion liquid and the rotation speed for the spin coating were changed, and other conditions were as in Example 1.

The dispersion liquid concentration and the spin coating rotation speed in each Example are shown in Table 1.

On each glass substrate BK7 having a diameter of 39 mm and a thickness of 2 mm, 0.2 mL of the liquid having particles dispersed in a dispersion medium in Example 7 was dropped, and a film was formed using a spin coater at a rotation speed shown in Table 1 for 90 sec. Subsequently, 0.2 mL of the solution containing a component necessary for forming a binder having a solid concentration of 0.8 wt % was dropped on the substrate provided with the film of the liquid having particles dispersed in a dispersion medium, and a film was formed using a spin coater under the same conditions as in the liquid having particles dispersed in a dispersion medium. Subsequently, the substrate after film formation was fired at 200 degrees Celsius for 1 hour to form a film to prepare an optical member. Similarly, films of Examples 8 to 25 were formed under the conditions shown in Table 1 to prepare optical members.

TABLE 1

| | Hollow particle concentration | Rotation speed for spin coating |
|---|---|---|
| Example 7 | 3.6 wt % | 2000 rpm |
| Example 8 | 4.0 wt % | 2000 rpm |
| Example 9 | 4.2 wt % | 2000 rpm |
| Example 10 | 4.4 wt % | 2000 rpm |
| Example 11 | 3.6 wt % | 2500 rpm |
| Example 12 | 3.8 wt % | 2500 rpm |
| Example 13 | 4.0 wt % | 2500 rpm |
| Example 14 | 4.2 wt % | 2500 rpm |
| Example 15 | 4.4 wt % | 2500 rpm |
| Example 16 | 3.6 wt % | 3000 rpm |
| Example 17 | 3.8 wt % | 3000 rpm |
| Example 18 | 4.0 wt % | 3000 rpm |
| Example 19 | 4.2 wt % | 3000 rpm |
| Example 20 | 4.4 wt % | 3000 rpm |
| Example 21 | 3.6 wt % | 4000 rpm |
| Example 22 | 4.0 wt % | 4000 rpm |
| Example 23 | 4.2 wt % | 4000 rpm |
| Example 24 | 4.4 wt % | 4000 rpm |
| Example 25 | 3.8 wt % | 4000 rpm |

(Evaluation)

The reflectivity of the optical member prepared in each Example was measured with lens spectral reflectivity measurement instrument (USPM-RU, manufactured by Olympus Corp.) over the wavelength of 400 to 700 nm as in Example 1. The refractive index and the thickness were determined from the refractive index of the substrate and the wavelength showing the minimum reflectivity. In addition, abrasion resistance and scattering were evaluated as in Example 1. The results are shown in Table 2.

TABLE 2

| | Refractive index | Film thickness | Abrasion resistance | Scattering value |
|---|---|---|---|---|
| Example 7 | 1.25 | 89 nm | satisfactory | 23 |
| Example 8 | 1.25 | 106 nm | satisfactory | 13 |
| Example 9 | 1.25 | 113 nm | satisfactory | 15 |
| Example 10 | 1.25 | 120 nm | satisfactory | 24 |
| Example 11 | 1.25 | 79 nm | satisfactory | 11 |
| Example 12 | 1.25 | 87 nm | satisfactory | 24 |
| Example 13 | 1.25 | 95 nm | satisfactory | 21 |
| Example 14 | 1.25 | 99 nm | satisfactory | 19 |
| Example 15 | 1.25 | 108 nm | satisfactory | 16 |
| Example 16 | 1.25 | 71 nm | satisfactory | 7 |
| Example 17 | 1.25 | 78 nm | satisfactory | 11 |
| Example 18 | 1.25 | 86 nm | satisfactory | 20 |
| Example 19 | 1.25 | 94 nm | satisfactory | 22 |

TABLE 2-continued

| | Refractive index | Film thickness | Abrasion resistance | Scattering value |
|---|---|---|---|---|
| Example 20 | 1.25 | 99 nm | satisfactory | 20 |
| Example 21 | 1.25 | 64 nm | satisfactory | 16 |
| Example 22 | 1.25 | 72 nm | satisfactory | 7 |
| Example 23 | 1.25 | 76 nm | satisfactory | 10 |
| Example 24 | 1.25 | 84 nm | satisfactory | 18 |
| Example 25 | 1.25 | 69 nm | satisfactory | 11 |

Figure 3:
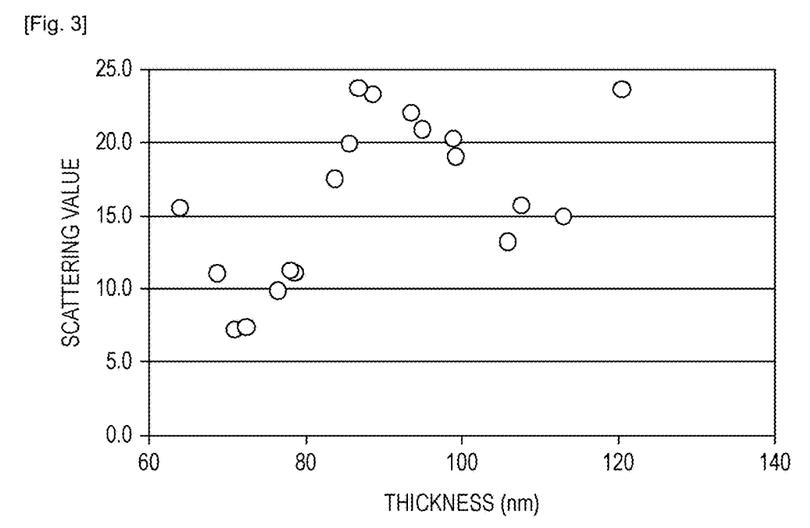
FIG. 3 is a graph plotting scattering values versus film thickness of antireflection films of Examples 7 to 25.

The initial refractive index was 1.25 in every Example, and after the abrasion resistance test, no variation in refractive index was confirmed, and no scratch was observed. FIG. 3 shows a relationship between the film thickness and the scattering value. It was confirmed that the scattering value had periodicity with respect to the film thickness. In Examples 7 to 25 where particles having an average particle radius of 25 nm were used, the scattering values were small at film thicknesses of about 71 nm and 112 nm, the film thicknesses approximate to those in the closest packing, and the scattering values were large in the ranges of film thickness of less than 71 nm, higher than 112 nm, and therebetween. The difference in film thickness between the minimum scattering values was about 40 nm.

The antireflection film of the present invention can be applied to an optical element having a function of reducing the reflected light intensity at the light incident/emitting surface, for example, an image pickup apparatus represented by a camera or a video camera or a projection apparatus represented by an optical scanning apparatus of a liquid crystal projector or electrophotographic equipment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-160078, filed Jul. 21, 2011, which is hereby incorporated by reference herein in its entirety.

The invention claimed is:

1. A method of producing, on a substrate, an optical member having an antireflection film, the method comprising:

performing coating with a liquid having particles dispersed in a dispersion medium and containing no component forming a binder, and then performing coating with a solution not containing the particles and containing a component forming a binder to form a layer in which spaces between the particles in the liquid having been used for the coating are filled with the binder by the solution being saturated between the particles; and drying the layer, wherein, in the layer, the particles are present both in an area close to a surface facing the substrate and an area close to a surface on a side opposite to the substrate, and are protruding from the surface on the side opposite to the substrate.

2. The method of producing, on a substrate, an optical member having an antireflection film according to claim 1, wherein the component forming the binder is an alkoxysilane hydrolysis-condensation product.

3. The method of producing, on a substrate, an optical member having an antireflection film according to claim 1, wherein the coating with the liquid having the particles dispersed in the dispersion medium and the coating with the solution containing the component forming the binder are performed by spin coating.

4. The method of producing, on a substrate, an optical member having an antireflection film according to claim 1, wherein the dispersion medium contains any one of 1-methoxy-2-propanol, methyl cellosolve, ethyl cellosolve, and butyl cellosolve.

5. The method of producing, on a substrate, an optical member having an antireflection film according to claim 1, wherein the particles are hollow particles containing silica.

6. The method of producing, on a substrate, an optical member having an antireflection film according to claim 1, comprising fowling another layer in addition to the single layer in which the binder is lying between the particles.

7. The method of producing, on a substrate, an optical member having an antireflection film according to claim 6, wherein forming another layer is performed by deposition of zirconium oxide, titanium oxide, tantalum oxide, niobium oxide, hafnium oxide, alumina, silica, or magnesium fluoride.

* * * * *